(12) United States Patent
Markande et al.

(10) Patent No.: US 10,262,266 B2
(45) Date of Patent: Apr. 16, 2019

(54) IDENTIFYING AND ANALYZING IMPACT OF AN EVENT ON RELATIONSHIPS

(71) Applicant: International Business Machines Corporation, Armonk, NY (US)

(72) Inventors: Mukul P. Markande, Pune (IN); Anil M. Omanwar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/901,040

(22) Filed: Feb. 21, 2018

(65) Prior Publication Data

US 2018/0157985 A1 Jun. 7, 2018

Related U.S. Application Data

(63) Continuation of application No. 15/273,808, filed on Sep. 23, 2016.

(51) Int. Cl.
*G06N 5/02* (2006.01)
*G06Q 30/02* (2012.01)
(Continued)

(52) U.S. Cl.
CPC ............. *G06N 5/022* (2013.01); *G06Q 10/10* (2013.01); *G06Q 30/0201* (2013.01);
(Continued)

(58) Field of Classification Search
CPC .... G06N 5/022; G06Q 10/10; G06Q 30/0201; G06Q 30/0202; G06Q 30/0241; G06Q 50/01
See application file for complete search history.

(56) References Cited

U.S. PATENT DOCUMENTS 8,676,887 B2 3/2014 Kim et al.
8,943,154 B1 * 1/2015 Bodell ................ H04L 41/0604
709/206
(Continued)

OTHER PUBLICATIONS

Mell, et al., "The NIST Definition of Cloud Computing; Recommendations of the National Institute of Standards and Technology", US Department of Commerce, Special Publication 800-145, Sep. 2011, 7 pages.

(Continued)

*Primary Examiner* — Eric Nilsson
(74) *Attorney, Agent, or Firm* — Peter J. Edwards

(57) ABSTRACT

The present invention provides a computer implemented method, a system, and a computer program product of identifying and analyzing the impact of an event associated with an entity on relationships of the entity. In an exemplary embodiment, the present invention includes storing data that identifies relationships with entities associated with the entity, based on data about the entity and data about the entities from at least one online website, storing data that identifies entity relationships, among the entity relationships identified in an entity relationship data structure, that are determined by the computer system to be affected by events associated with event categories, receiving data about events related to the entity, and outputting data related to a recommendation for a second entity among the entities associated with the entity, wherein the second entity corresponds to a most affected relationship, based on data associated with the second entity.

1 Claim, 8 Drawing Sheets

(51) Int. Cl.
*G06Q 10/10* (2012.01)
*G06Q 50/00* (2012.01)

(52) U.S. Cl.
CPC ..... *G06Q 30/0202* (2013.01); *G06Q 30/0241* (2013.01); *G06Q 50/01* (2013.01)

(56) References Cited

U.S. PATENT DOCUMENTS

| | | |
|---|---|---|
| 9,094,355 B1 | 7/2015 | Duddu et al. |
| 9,294,432 B2 | 3/2016 | Olsen et al. |
| 2008/0243632 A1* | 10/2008 | Kane ................. G06F 17/30867 705/14.66 |
| 2015/0127629 A9 | 5/2015 | Chow |
| 2016/0071161 A1 | 3/2016 | Kim et al. |
| 2016/0203575 A1 | 7/2016 | Madhu et al. |
| 2016/0216857 A1 | 7/2016 | Hulet et al. |

OTHER PUBLICATIONS

Markande et al., "Identifying and Analyzing Impact of an Event on Relationships," U.S. Appl. No. 15/283,808, filed Sep. 23, 2016.
List of IBM Patents or Patent Applications Treated as Related, Dated Feb. 20, 2018, 2 pages.

* cited by examiner

IDENTIFYING AND ANALYZING IMPACT OF AN EVENT ON RELATIONSHIPS

BACKGROUND

The present disclosure relates to computer software, and more specifically, to identifying and analyzing the impact of an event associated with an entity on relationships of the entity.

SUMMARY

The present invention provides a computer implemented method, a system, and a computer program product of identifying and analyzing the impact of an event associated with an entity on relationships of the entity. In an exemplary embodiment, the computer implemented method, the system, and the computer program product include (1) storing, by a computer system, data that identifies relationships with entities associated with an entity (entity relationships), based on data about the entity and data about the entities from at least one online website, in a first data structure (entity relationship data structure), (2) storing, by the computer system, data that identifies entity relationships, among the entity relationships identified in the entity relationship data structure, that are determined by the computer system to be affected by events associated with event categories, in a second data structure (impact data structure), (3) receiving, by the computer system, data about events related to the entity (entity events), where the data includes types of the entity events (event types), (4) identifying, by the computer system, based on a parsing by the computer system of the received data, impacting events among the entity events, where the impacting events are determined by the computer system to impact the entity relationships identified in the impact data structure, (5) for each impacting event among the impacting events, calculating, by the computer system, an impact score based on at least the event categories, data about sentiment about the impacting event, and an event type of the impacting event, thereby resulting in calculated impact scores, (6) for each impacting event among the impacting events, identifying, by the computer system, likely affected relationships (LARs) among the entity relationships identified in the impact data structure based on the calculated impact scores, (7) for each likely affected relationship (LAR) among the LARs for each impacting event among the impacting events, calculating, by the computer system, at least an emotional index value and a relation index value, (8) for each LAR among the LARs for each impacting event among the impacting events, calculating a final reaction score value based on at least a previous reaction score value for the LAR, the relation index value for the LAR, and the event type of the impacting event, thereby resulting in final reaction scores for the LARs, (9) identifying, by the computer system, a most affected relationship (MAR) among the LARs for each impacting event among the impacting events based on the final reaction scores, and (10) outputting, by the computer system, data related to a recommendation for a second entity among the entities associated with the entity, wherein the second entity corresponds to the MAR, based on data associated with the second entity (second entity data).

DETAILED DESCRIPTION

Figure 1A:
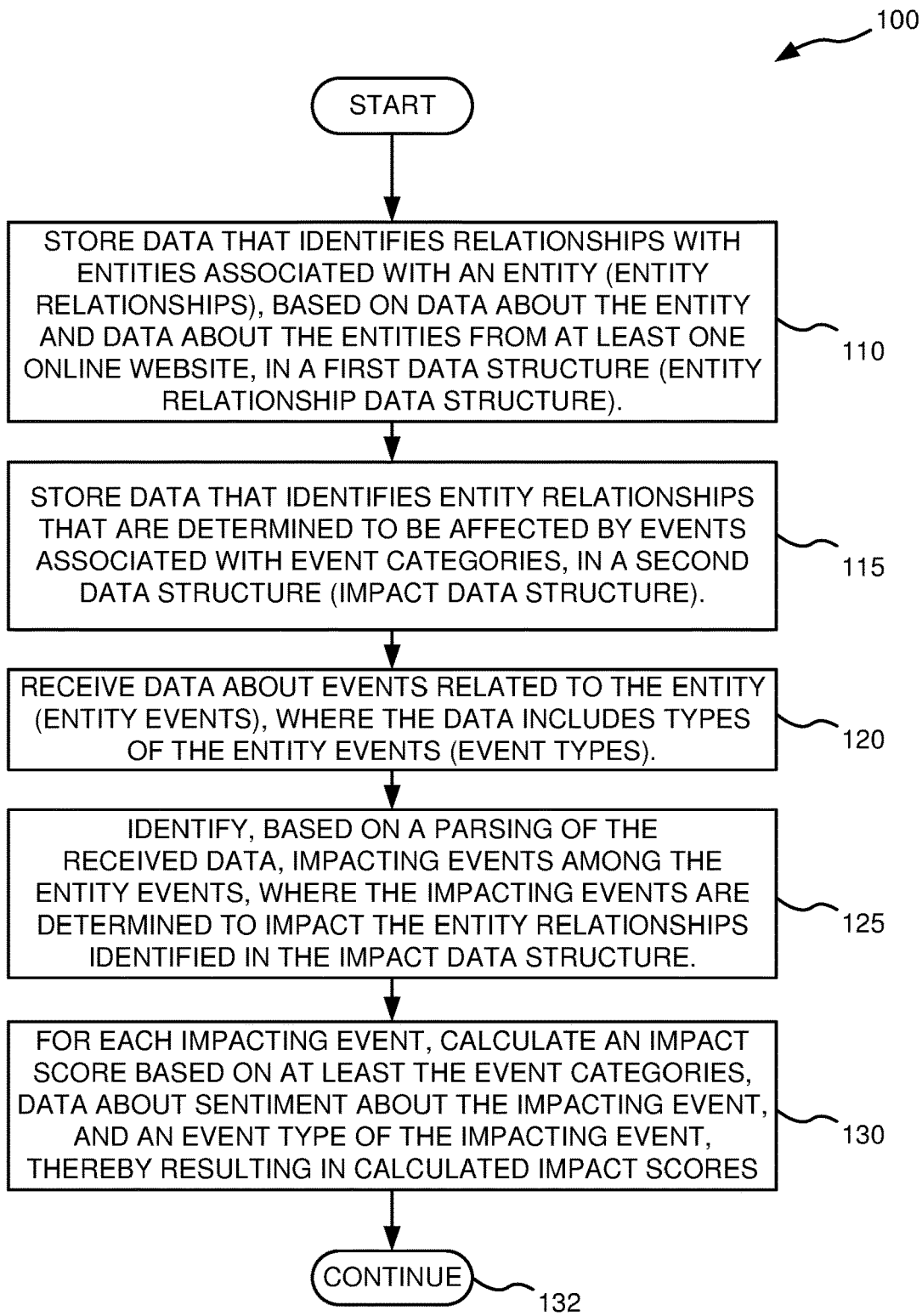
FIG. 1A depicts a flowchart in accordance with an exemplary embodiment of the present invention.

The present invention provides a computer implemented method, a system, and a computer program product of identifying and analyzing the impact of an event associated with an entity on relationships of the entity. In an exemplary embodiment, the computer implemented method, the system, and the computer program product include (1) storing, by a computer system, data that identifies relationships with entities associated with an entity (entity relationships), based on data about the entity and data about the entities from at least one online website, in a first data structure (entity relationship data structure), (2) storing, by the computer system, data that identifies entity relationships, among the entity relationships identified in the entity relationship data structure, that are determined by the computer system to be affected by events associated with event categories, in a second data structure (impact data structure), (3) receiving, by the computer system, data about events related to the entity (entity events), where the data includes types of the entity events (event types), (4) identifying, by the computer system, based on a parsing by the computer system of the received data, impacting events among the entity events, where the impacting events are determined by the computer system to impact the entity relationships identified in the impact data structure, (5) for each impacting event among the impacting events, calculating, by the computer system, an impact score based on at least the event categories, data about sentiment about the impacting event, and an event type of the impacting event, thereby resulting in calculated impact scores, (6) for each impacting event among the impacting events, identifying, by the computer system, likely affected relationships (LARs) among the entity relationships identified in the impact data structure based on the calculated impact scores, (7) for each likely affected relationship (LAR) among the LARs for each impacting event among the impacting events, calculating, by the computer system, at least an emotional index value and a relation index value, (8) for each LAR among the LARs for each impacting event among the impacting events, calculating a final reaction score value based on at least a previous reaction score value for the LAR, the relation index value for the LAR, and the event type of the impacting event, thereby resulting in final reaction scores for the LARs, (9) identifying, by the computer system, a most affected relationship (MAR) among the LARs for each impacting event among the impacting events based on the final reaction scores, and (10) outputting, by the computer system, data related to a recommendation for a second entity among the entities associated with the entity, wherein the second entity corresponds to the MAR, based on data associated with the second entity (second entity data).

Various software mechanisms can analyze an event (e.g., an exam) and project an impact of the event on an entity/individual (e.g., entity X), such that entity X could expect to start seeing advertisements on entity X's social media related to the event (e.g., advertisements for products/services that could help entity X with his exam (e.g., coaching classes, crash courses) or for yoga classes to ease entity X's tension about the exam).

Figure 1B:
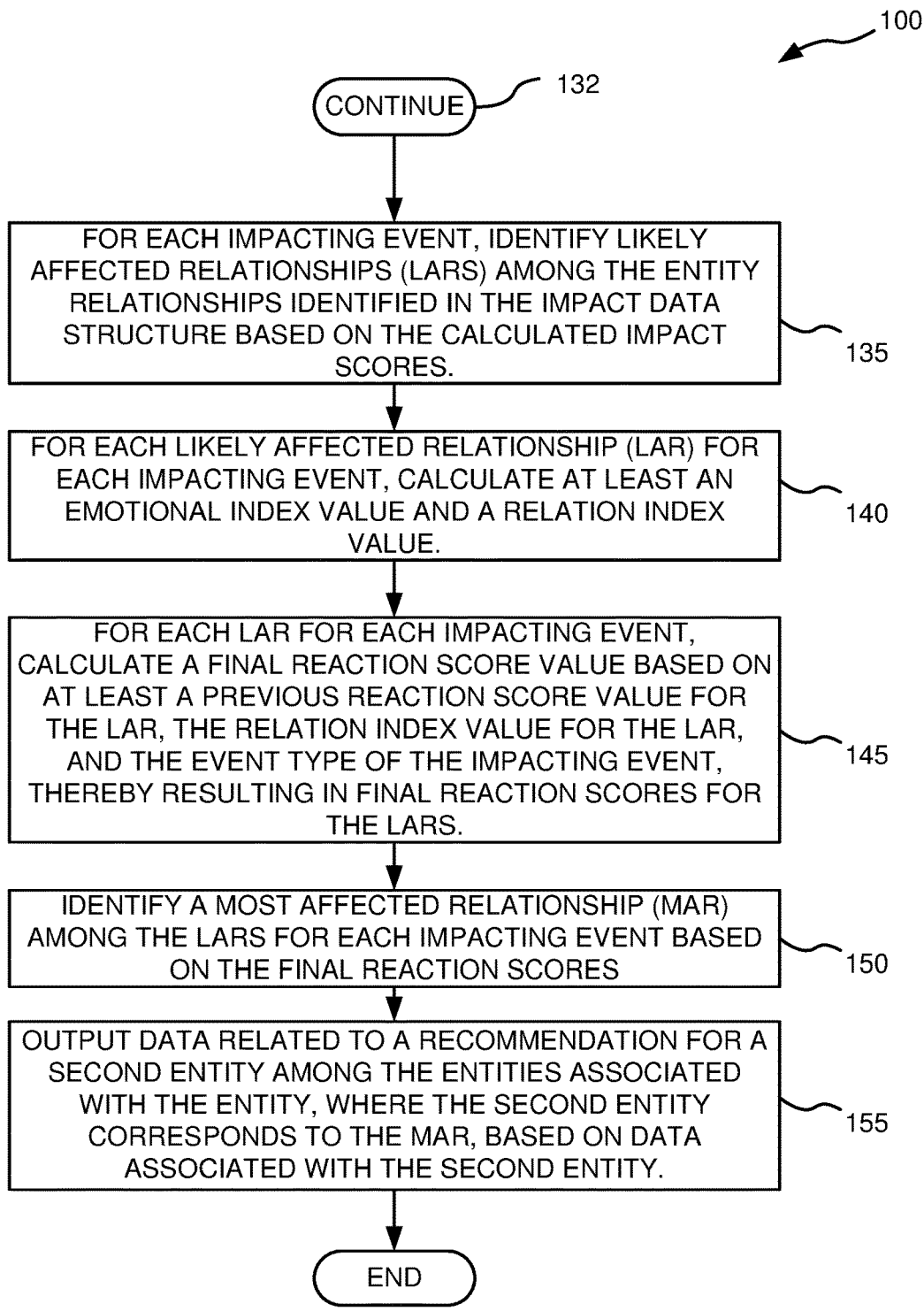
FIG. 1B depicts a flowchart in accordance with an exemplary embodiment of the present invention.

Referring to FIG. 1A and FIG. 1B, in an exemplary embodiment, the present invention is configured to perform an operation 110 of storing, by a computer system, data that identifies relationships with entities associated with an entity (entity relationships), based on data about the entity and data about the entities from at least one online website, in a first data structure (entity relationship data structure), an operation 115 of storing, by the computer system, data that identifies entity relationships, among the entity relationships identified in the entity relationship data structure, that are determined by the computer system to be affected by events associated with event categories, in a second data structure (impact data structure), an operation 120 of receiving, by the computer system, data about events related to the entity (entity events), where the data includes types of the entity events (event types), an operation 125 of identifying, by the computer system, based on a parsing by the computer system of the received data, impacting events among the entity events, where the impacting events are determined by the computer system to impact the entity relationships identified in the impact data structure, an operation 130 of, for each impacting event among the impacting events, calculating, by the computer system, an impact score based on at least the event categories, data about sentiment about the impacting event, and an event type of the impacting event, thereby resulting in calculated impact scores, an operation 135 of, for each impacting event among the impacting events, identifying, by the computer system, likely affected relationships (LARs) among the entity relationships identified in the impact data structure based on the calculated impact scores, an operation 140 of, for each likely affected relationship (LAR) among the LARs for each impacting event among the impacting events, calculating, by the computer system, at least an emotional index value and a relation index value, an operation 145 of, for each LAR among the LARs for each impacting event among the impacting events, calculating a final reaction score value based on at least a previous reaction score value for the LAR, the relation index value for the LAR, and the event type of the impacting event, thereby resulting in final reaction scores for the LARs, an operation 150 of identifying, by the computer system, a most affected relationship (MAR) among the LARs for each impacting event among the impacting events based on the final reaction scores, and an operation 155 of outputting, by the computer system, data related to a recommendation for a second entity among the entities associated with the entity, where the second entity corresponds to the MAR, based on data associated with the second entity (second entity data).

Figure 4:
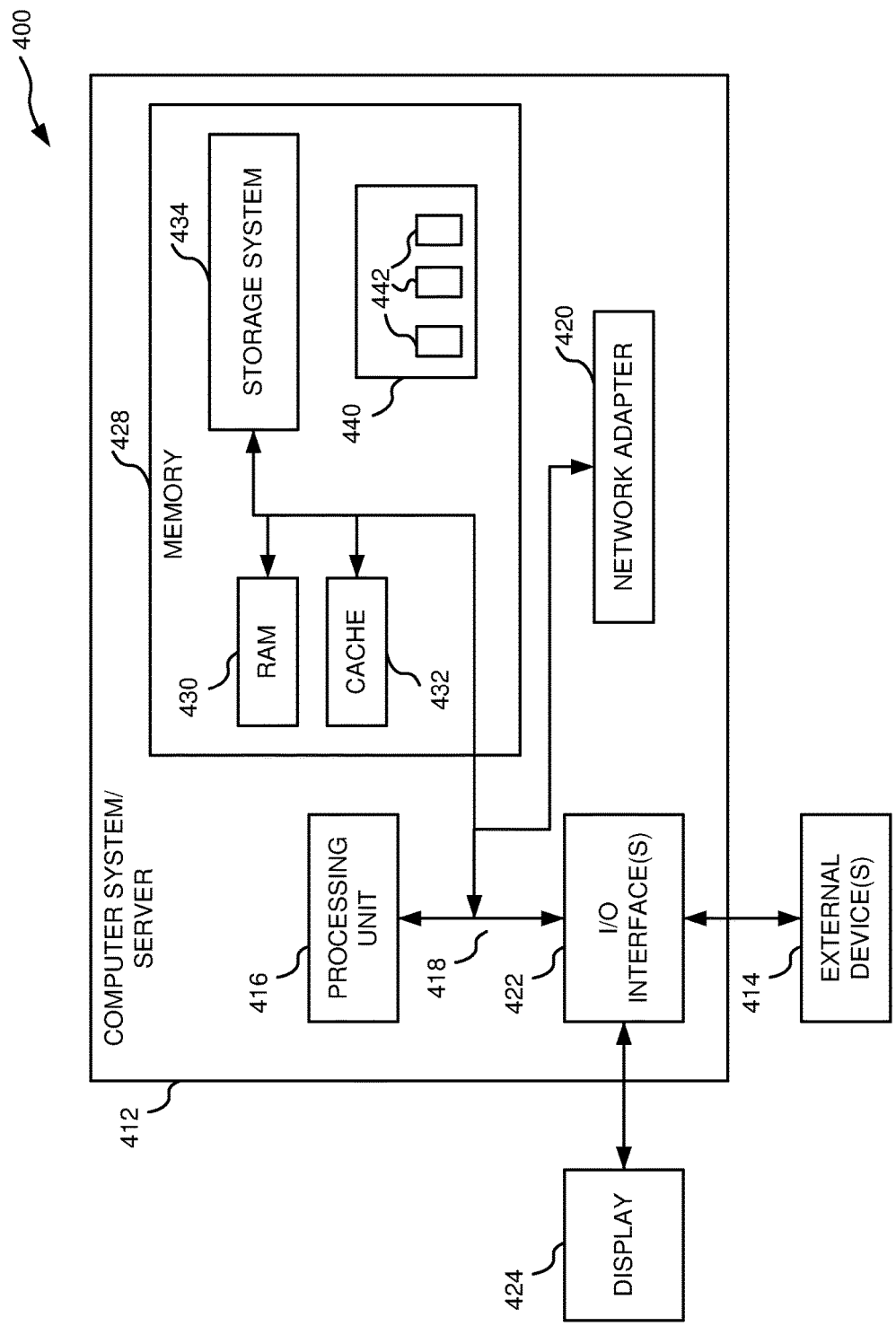
FIG. 4 depicts a computer system in accordance with an exemplary embodiment of the present invention.

In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out the operations of at least method 100.

In an exemplary embodiment, the relationships include at least one of friends of the entity, followers of the entity, family members of the entity, professional associates of the entity, coworkers of the entity, teachers of the entity, and relatives of the entity. In an exemplary embodiment, the first data structure includes a weighted knowledge graph. In an exemplary embodiment, the second data structure includes a table.

Figure 1C:
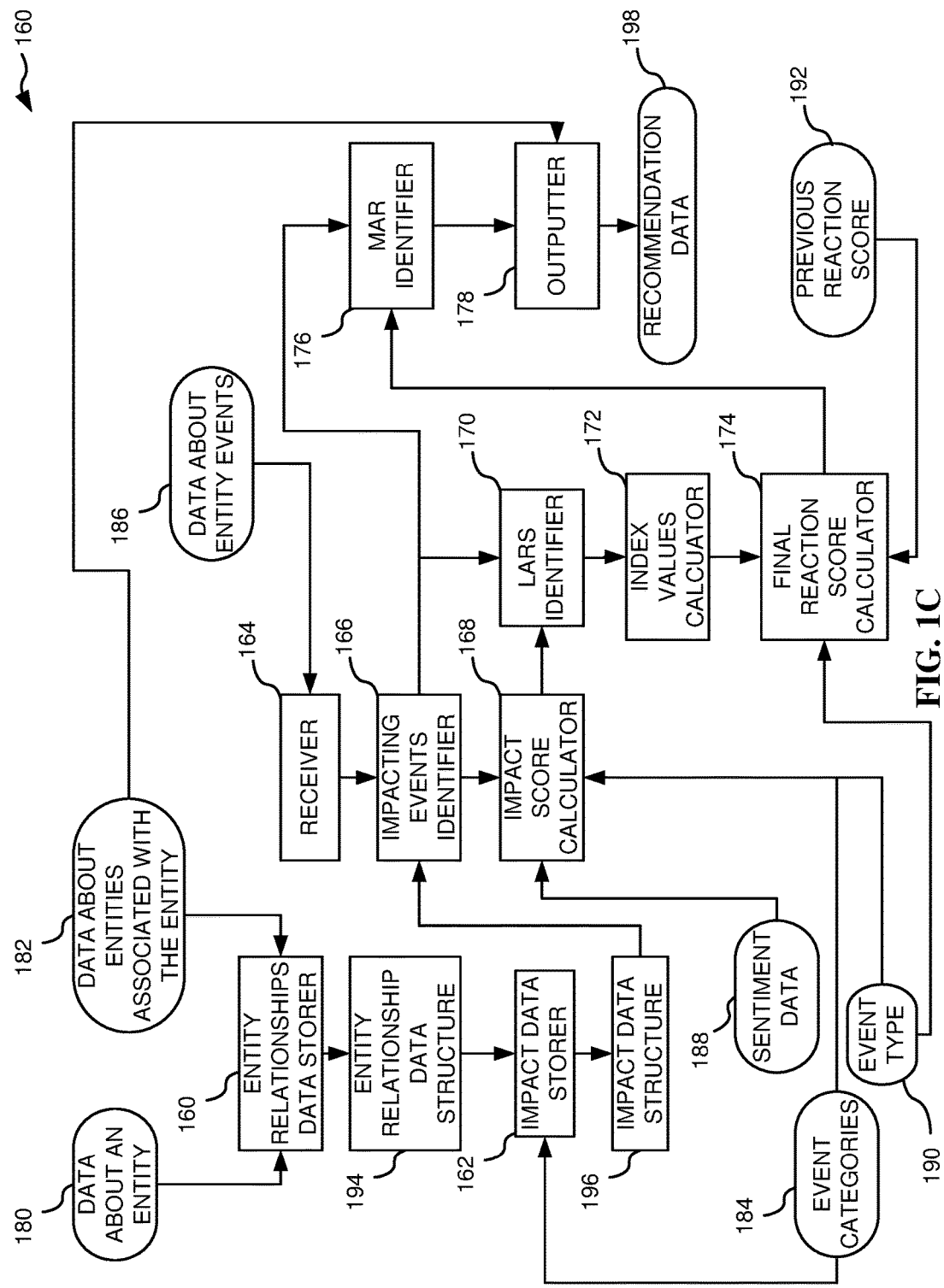
FIG. 1C depicts a block diagram in accordance with an exemplary embodiment of the present invention.

Referring to FIG. 1C, in an exemplary embodiment, the present invention includes an entity relationships data storer 160, an impact data storer 162, a receiver 164, an impacting events identifier 166, an impact score calculator 168, a LARS (likely affected relationships) identifier 170, an index values calculator 172, a final reaction score calculator 174, a MAR (most affected relationship) identifier 176, and an outputter 178. In an exemplary embodiment, entity relationships data storer 160 is configured to store data that identifies relationships with entities associated with an entity (entity relationships), based on data about the entity (data about an entity 180), and data about the entities (data about entities associated with the entity 182) from at least one online website, in a first data structure, entity relationship data structure 194. In an exemplary embodiment, impact data storer 162 is configured to store data that identifies entity relationships, among the entity relationships identified in entity relationship data structure 194, that are determined to be affected by events associated with event categories, in a second data structure, impact data structure 196. In an exemplary embodiment, receiver 164 is configured to receive data about events 186 related to the entity (entity events), where the data, data about events 186, includes types of the entity events (event types).

In an exemplary embodiment, impacting events identifier 166 is configured to identify, based on a parsing of the received data, data about events 186, impacting events among the entity events, where the impacting events are determined to impact the entity relationships identified in impact data structure 194. In an exemplary embodiment, impact score calculator 168 is configured to, for each impacting event among the impacting events, calculate an impact score based on at least event categories 184, data about sentiment about the impacting event (sentiment data 188), and an event type 190 of the impacting event, thereby resulting in calculated impact scores. In an exemplary embodiment, LARS identifier 170 is configured to, for each impacting event among the impacting events, identify likely affected relationships (LARs) among the entity relationships identified in impact data structure 196 based on the calculated impact scores. In an exemplary embodiment, index values calculator 172 is configured to, for each likely affected relationship (LAR) among the LARs for each impacting event among the impacting events, calculate at least an emotional index value and a relation index value.

In an exemplary embodiment, final reaction score calculator 174 is configured to, for each LAR among the LARs for each impacting event among the impacting events, calculate a final reaction score value based on at least a previous reaction score value for the LAR (previous reaction score 192), the relation index value for the LAR, and the event type of the impacting event (event type 190), thereby resulting in final reaction scores for the LARs. In an exemplary embodiment, MAR identifier 176 is configured to identify a most affected relationship (MAR) among the LARs for each impacting event among the impacting events based on the final reaction scores. In an exemplary embodiment, outputter 178 is configured to output data related to a recommendation, recommendation data 198, for a second entity among the entities associated with the entity, where the second entity corresponds to the MAR, based on data associated with the second entity (second entity data), a subset of data about entities associated with the entity 182.

In an exemplary embodiment, entity relationships data storer 160 includes a computer system, such as computer system 400 as shown in FIG. 4, performing operation 110. In an exemplary embodiment, entity relationships data storer 160 is implemented as computer software executing on a computer system, such as computer system 400 as shown in FIG. 4, such that the computer system performs operation 110. In an exemplary embodiment, impact data storer 162 includes a computer system, such as computer system 400 as shown in FIG. 4, performing operation 115. In an exemplary embodiment, impact data storer 162 is implemented as computer software executing on a computer system, such as computer system 400 as shown in FIG. 4, such that the computer system performs operation 115. In an exemplary embodiment, receiver 164 includes a computer system, such as computer system 400 as shown in FIG. 4, performing operation 120. In an exemplary embodiment, receiver 164 is implemented as computer software executing on a computer system, such as computer system 400 as shown in FIG. 4, such that the computer system performs operation 120.

In an exemplary embodiment, impacting events identifier 166 includes a computer system, such as computer system 400 as shown in FIG. 4, performing operation 125. In an exemplary embodiment, impacting events identifier 166 is implemented as computer software executing on a computer system, such as computer system 400 as shown in FIG. 4, such that the computer system performs operation 125. In an exemplary embodiment, impact score calculator 168 includes a computer system, such as computer system 400 as shown in FIG. 4, performing operation 130. In an exemplary embodiment, impact score calculator 168 is implemented as computer software executing on a computer system, such as computer system 400 as shown in FIG. 4, such that the computer system performs operation 130. In an exemplary embodiment, LARS identifier 170 includes a computer system, such as computer system 400 as shown in FIG. 4, performing operation 135. In an exemplary embodiment, LARS identifier 170 is implemented as computer software executing on a computer system, such as computer system 400 as shown in FIG. 4, such that the computer system performs operation 135. In an exemplary embodiment, index values calculator 172 includes a computer system, such as computer system 400 as shown in FIG. 4, performing operation 140. In an exemplary embodiment, index values calculator 172 is implemented as computer software executing on a computer system, such as computer system 400 as shown in FIG. 4, such that the computer system performs operation 140.

In an exemplary embodiment, final reaction score calculator 174 includes a computer system, such as computer system 400 as shown in FIG. 4, performing operation 145. In an exemplary embodiment, final reaction score calculator 174 is implemented as computer software executing on a computer system, such as computer system 400 as shown in FIG. 4, such that the computer system performs operation 145. In an exemplary embodiment, MAR identifier 176 includes a computer system, such as computer system 400 as shown in FIG. 4, performing operation 150. In an exemplary embodiment, MAR identifier 176 is implemented as computer software executing on a computer system, such as computer system 400 as shown in FIG. 4, such that the computer system performs operation 150. In an exemplary embodiment, outputter 178 includes a computer system, such as computer system 400 as shown in FIG. 4, performing operation 155. In an exemplary embodiment, outputter 178 is implemented as computer software executing on a computer system, such as computer system 400 as shown in FIG. 4, such that the computer system performs operation 155.

Entity Relationship Data Structure

Figure 2:
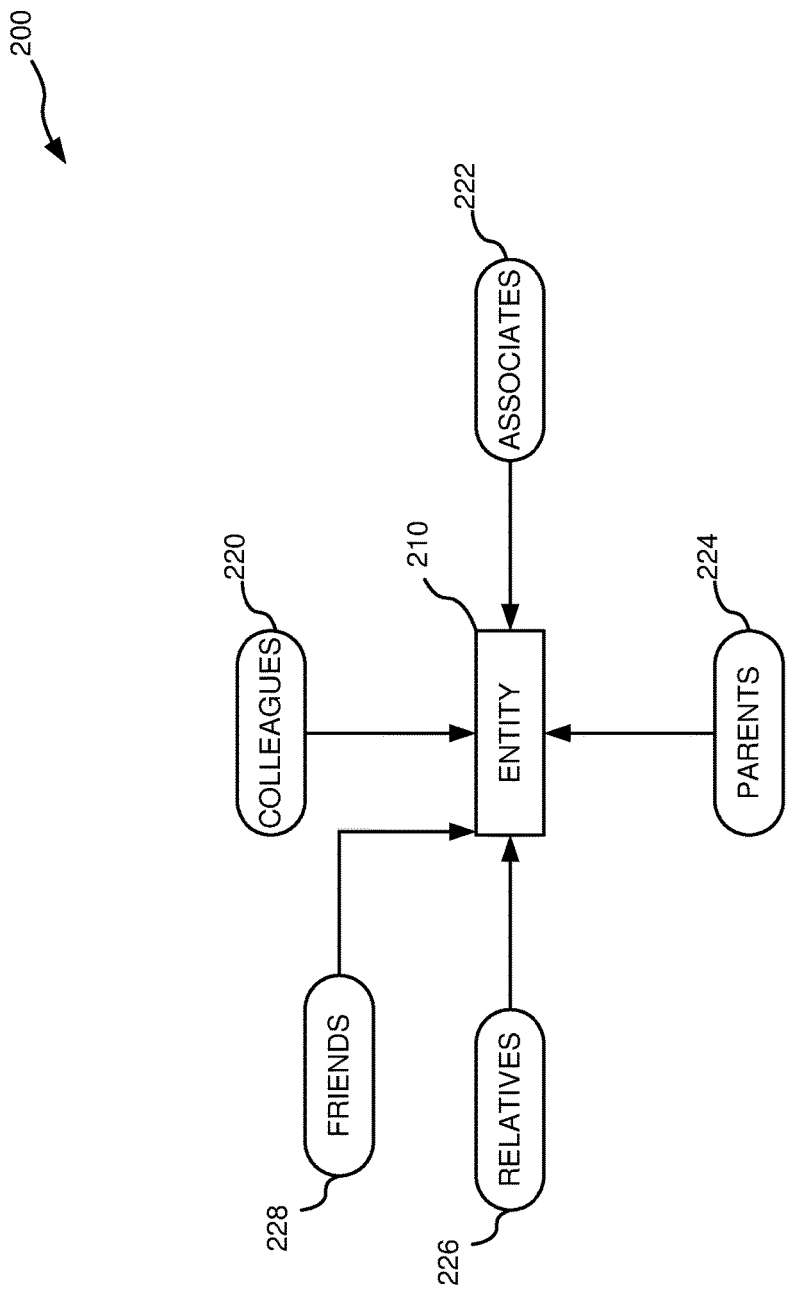
FIG. 2 depicts an entity relationship data structure in accordance with an exemplary embodiment of the present invention.

For example, referring to FIG. 2, in an exemplary embodiment, entity relationships data storer 160 is configured to store data that identifies relationships with entities associated with an entity (entity relationships), based on data about the entity (data about an entity 180), and data about the entities (data about entities associated with the entity 182) from at least one online website, in a first data structure, entity relationship data structure 194, such as an entity relationship graph and such as a weighted knowledge graph 200. For example, as shown in weighted knowledge graph 200, entity relationships identified by entity relationships data storer 160 include colleagues 220 of entity 210, associates 222 of entity 210, parents 224 of entity 210, relatives 226 of entity 210, and friends 228 of entity 210. In an exemplary embodiment, entity relationship data structure 194 is weighted knowledge graph 200 at least because the number of entities associated with entity 210 could be unknown.

Impact Data Structure

Figure 3:
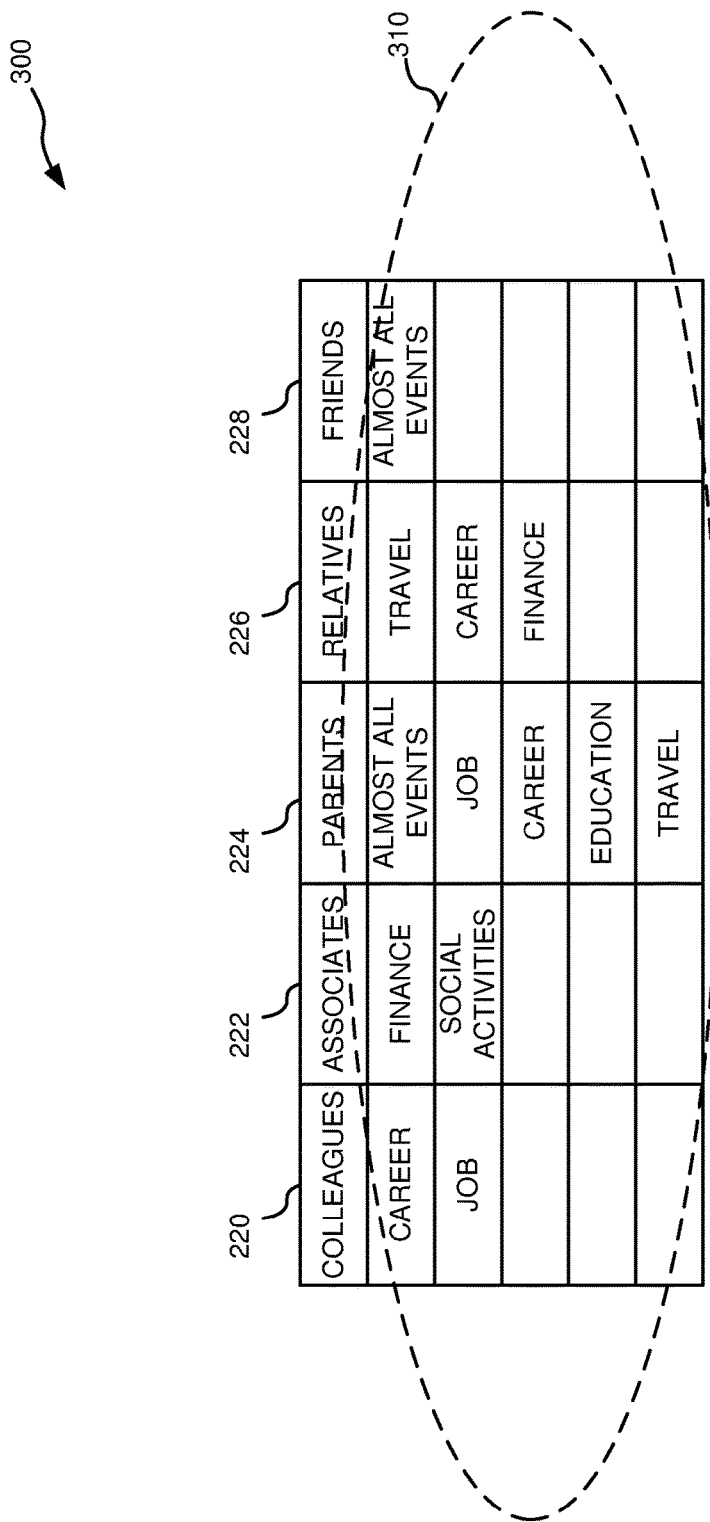
FIG. 3 depicts an impact data structure in accordance with an exemplary embodiment of the present invention.

For example, referring to FIG. 3, in an exemplary embodiment, impact data storer 162 is configured to store data that identifies entity relationships, among the entity relationships 220, 222, 224, 226, and 228, identified in entity relationship data structure 194, that are determined to be affected by events associated with event categories 310, in a second data structure, impact data structure 196, such as an impact matrix and such as an impact table 300. For example, event categories 310 include career, job, finance, social activities, almost all events, education, and travel. For example, as shown in impact table 300, impact data storer 162 indicates that colleagues 220 are affected by events associated with event categories career and job, that associates are affected by events associated with event categories finance and social activities, that parents 224 are affected by events associated with event categories almost all events, job, career, education, and travel, that relatives 226 are affected by events associated with event categories travel, career, and finance, and that friend 228 are affected by events associated with event category almost all events.

Storing Data that Identifies Entity Relationships

In an exemplary embodiment, the storing data that identifies relationships with the entities associated with the entity includes analyzing, by the computer system, at least one of at least one online social media profile of the entity, at least one online social media feed of the entity, at least one online presence of the entity, at least one online blog of the entity, at least one online career profile of the entity, at least one online description of at least one hobby of the entity, and at least one online description of at least one activity of the entity. In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out operation 110.

Receiving Data about Entity Events

In an exemplary embodiment, the receiving includes obtaining, by the computer system, data from at least one online social media post of the entity. In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out operation 120.

Identifying Impacting Events

In an exemplary embodiment, the identifying from the received data the impacting events includes classifying, by the computer system, at least one social media post of the entity as an impacting event among the impacting events based on at least an analysis by the computer system of at least one text string identified by the computer system in the post. In a specific embodiment, the identifying from the received data the impacting events further includes classifying, by the computer system, the post as the impacting event based on an analysis by the computer system of at least one hashtag identified by the computer system in the post. In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out operation 125.

Identifying LARs

In an exemplary embodiment, the identifying LARs includes using, by the computer system, at least one of heuristics, accumulated data describing interactions between the entity and the entities associated with the entity, and calculated relationship weightings. In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out operation 135.

Calculating the Emotional Index and the Relation Index

In an exemplary embodiment, the calculating at least the emotional index value and the relation index value includes identifying, by the computer system, commonalities between the entity and the LAR. In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out operation 145.

Outputting a Recommendation

In an exemplary embodiment, the outputting includes executing, by the computer system, an algorithm that performs a psychographic profile analysis of the second entity based on the second entity data. In an exemplary embodiment, the recommendation includes at least one of a next action, advice, and a preferred activity. In a specific embodiment, the recommendation further includes at least one of an online advertisement, an advertisement on an online social media website, a name of a group to join on an online social media website, and a name of a contact who could be of help to the second entity. In an exemplary embodiment, the computer system can be a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an exemplary embodiment, the computer system is configured to execute an identifying and analyzing script or computer software application that carries out operation 155.

Computer System

In an exemplary embodiment, the computer system is a computer system 400 as shown in FIG. 4. Computer system 400 is only one example of a computer system and is not intended to suggest any limitation as to the scope of use or functionality of embodiments of the present invention. Regardless, computer system 400 is capable of being implemented and/or performing any of the functionality/operations of the present invention.

Computer system 400 includes a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 412 may be described in the general context of computer system-executable instructions, such as program modules, being executed by a computer system. Generally, program modules may include routines, programs, objects, components, logic, and/or data structures that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computer system 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions/operations of embodiments of the invention.

Program/utility 440, having a set (at least one) of program modules 442, may be stored in memory 428 by way of example, and not limitation. Exemplary program modules 442 may include an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the present invention.

Computer system/server 412 may also communicate with one or more external devices 414 such as a keyboard, a pointing device, a display 424, one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
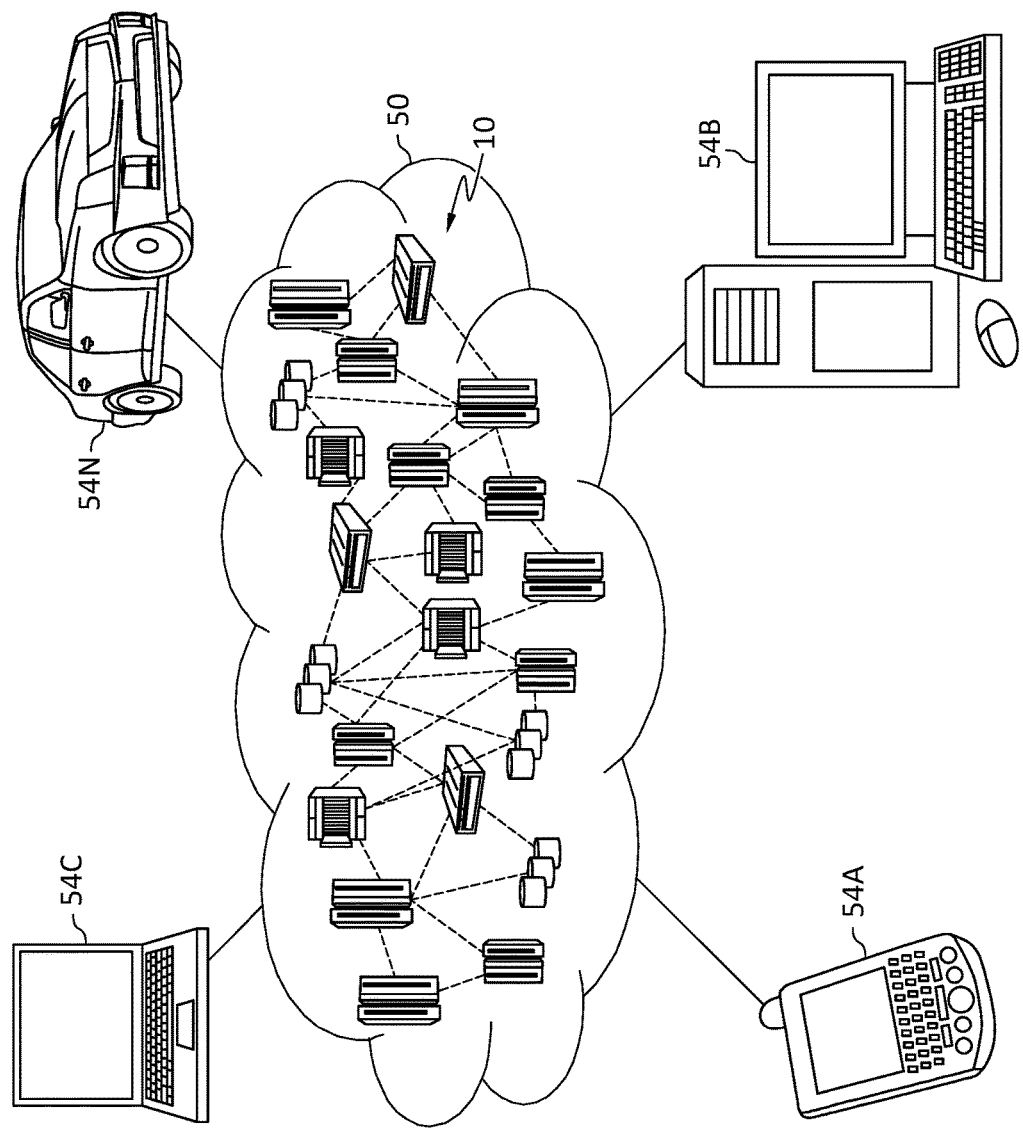
FIG. 5 depicts a cloud computing environment, according to various embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
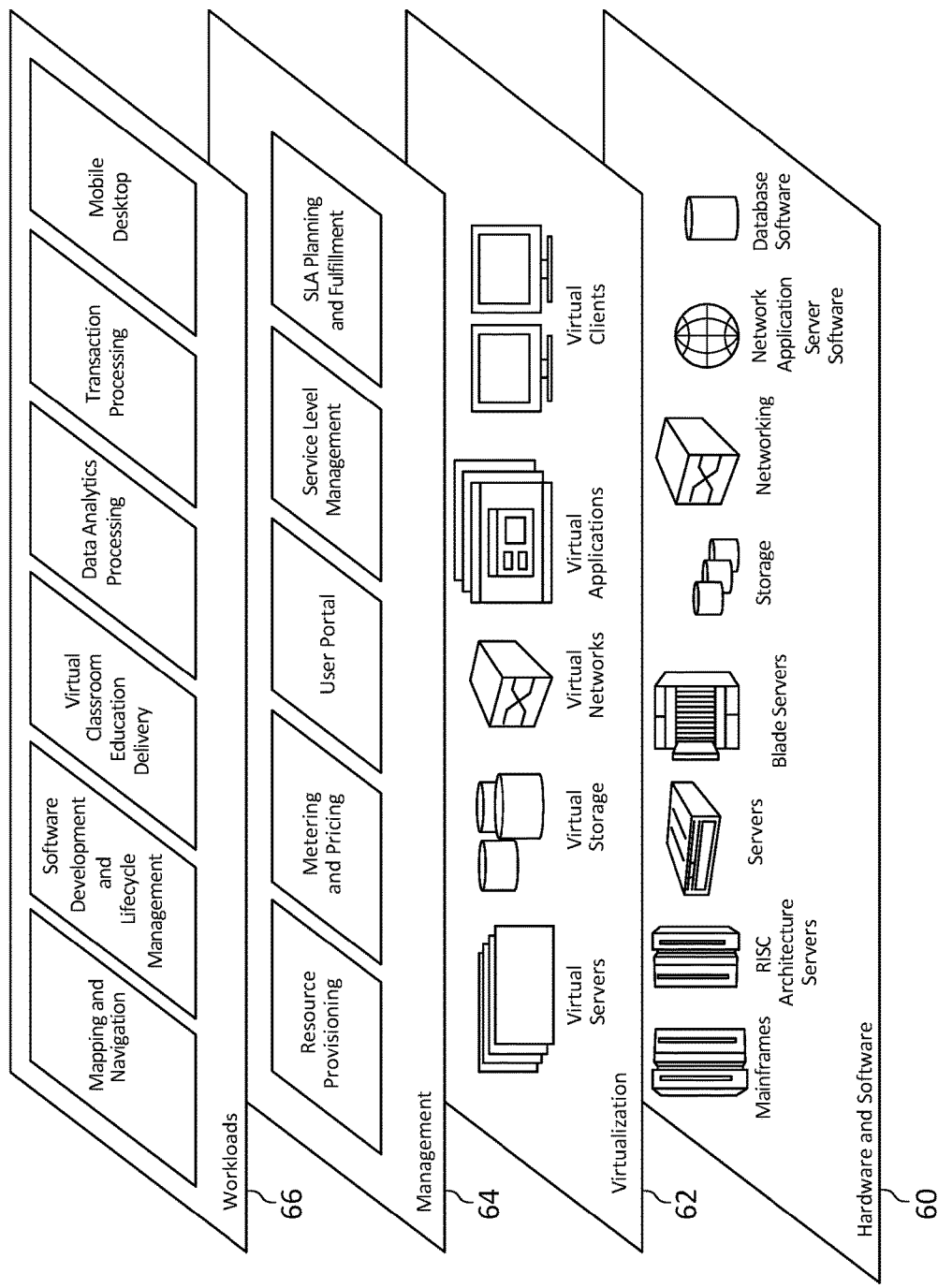
FIG. 6 depicts abstraction model layers according to various embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    storing, by a computer system, data that identifies relationships with entities associated with an entity (entity relationships), based on data about the entity and data about the entities from at least one online website, in a first data structure (entity relationship data structure),
        wherein the storing data that identifies relationships with the entities associated with the entity comprises analyzing, by the computer system, at least one of at least one online social media profile of the entity, at least one online social media feed of the entity, at least one online presence of the entity, at least one online blog of the entity, at least one online career profile of the entity, at least one online description of at least one hobby of the entity, and at least one online description of at least one activity of the entity;
    storing, by the computer system, data that identifies entity relationships, among the entity relationships identified in the entity relationship data structure, that are determined by the computer system to be affected by events associated with event categories, in a second data structure (impact data structure);
    receiving, by the computer system, data about events related to the entity (entity events), wherein the data comprises types of the entity events (event types),
        wherein the receiving comprises obtaining, by the computer system, data from at least one online social media post of the entity;

identifying, by the computer system, based on a parsing by the computer system of the received data, impacting events among the entity events, wherein the impacting events are determined by the computer system to impact the entity relationships identified in the impact data structure,
  wherein the identifying from the received data the impacting events comprises classifying, by the computer system, at least one social media post of the entity as an impacting event among the impacting events based on at least an analysis by the computer system of at least one text string identified by the computer system in the post;
for each impacting event among the impacting events, calculating, by the computer system, an impact score based on at least the event categories, data about sentiment about the impacting event, and an event type of the impacting event, thereby resulting in calculated impact scores;
for each impacting event among the impacting events, identifying, by the computer system, likely affected relationships (LARs) among the entity relationships identified in the impact data structure based on the calculated impact scores,
  wherein the identifying LARs comprises using, by the computer system, at least one of heuristics, accumulated data describing interactions between the entity and the entities associated with the entity, and calculated relationship weightings;
for each likely affected relationship (LAR) among the LARs for each impacting event among the impacting events, calculating, by the computer system, at least an emotional index value and a relation index value,
  wherein the calculating at least the emotional index value and the relation index value comprises identifying, by the computer system, commonalities between the entity and the LAR;
for each LAR among the LARs for each impacting event among the impacting events, calculating a final reaction score value based on at least a previous reaction score value for the LAR, the relation index value for the LAR, and the event type of the impacting event, thereby resulting in final reaction scores for the LARs;
identifying, by the computer system, a most affected relationship (MAR) among the LARs for each impacting event among the impacting events based on the final reaction scores; and
outputting, by the computer system, data related to a recommendation for a second entity among the entities associated with the entity, wherein the second entity corresponds to the MAR, based on data associated with the second entity (second entity data), and wherein the recommendation includes at least an advertisement,
  wherein the outputting comprises executing, by the computer system, an algorithm that performs a psychographic profile analysis of the second entity based on the second entity data.

* * * * *